US010518657B2

(12) United States Patent
Wheatley et al.

(10) Patent No.: US 10,518,657 B2
(45) Date of Patent: Dec. 31, 2019

(54) LIGHT STANDARD WITH ELECTRIC VEHICLE (EV) CHARGER

(71) Applicant: ENVISION SOLAR INTERNATIONAL, INC., San Diego, CA (US)

(72) Inventors: Desmond Wheatley, Rancho Santa Fe, CA (US); Patrick Senatore, San Diego, CA (US)

(73) Assignee: Envision Solar International, Inc., San Diego, CA (US)

( * ) Notice: Subject to any disclaimer, the term of this patent is extended or adjusted under 35 U.S.C. 154(b) by 92 days.

(21) Appl. No.: 15/879,156

(22) Filed: Jan. 24, 2018

(65) Prior Publication Data

US 2019/0225091 A1    Jul. 25, 2019

(51) Int. Cl.

| B60L 53/14 | (2019.01) |
|---|---|
| H02J 3/38 | (2006.01) |
| F21V 33/00 | (2006.01) |
| H02S 40/38 | (2014.01) |
| H02S 20/32 | (2014.01) |

(Continued)

(52) U.S. Cl.
CPC ............... *B60L 53/14* (2019.02); *B60L 53/31* (2019.02); *F03D 1/04* (2013.01); *F03D 9/007* (2013.01); *F03D 9/11* (2016.05); *F03D 9/25* (2016.05); *F03D 13/20* (2016.05); *F21S 8/086* (2013.01); *F21S 9/035* (2013.01); *F21S 9/043* (2013.01); *F21V 33/00* (2013.01); *H02J 3/383* (2013.01); *H02J 3/386* (2013.01); *H02J 7/35* (2013.01); *H02S 10/12* (2014.12); *H02S 20/10* (2014.12);

(Continued)

(58) Field of Classification Search
CPC .......... B60L 53/14; B60L 53/00; B60L 53/31; H02S 20/32; H02S 40/38; F03D 9/11; F03D 9/25; F03D 13/20; F03D 1/04; F03D 9/007; F21S 8/086; F21V 33/00; H02J 3/383; H02J 3/386; H02J 7/35; F21Y 2115/10; Y02T 90/12
See application file for complete search history.

(56) References Cited

U.S. PATENT DOCUMENTS

| 4,209,236 A | 6/1980 | Horton |
|---|---|---|
| 5,315,227 A | 5/1994 | Pierson |

(Continued)

OTHER PUBLICATIONS

PCT/US19/14804—Notification of Transmittal of the International Search Report and the Written Opinion of the International Searching Authority, or the Declaration, dated May 30, 2019.

*Primary Examiner* — Carlos Amaya
(74) *Attorney, Agent, or Firm* — Nydegger & Associates

(57) ABSTRACT

A charging station for electric vehicles (EVs) is mounted on a public light post which receives an allotment of electric energy from a distributed power grid. In addition to its electrical connection with the distributed power grid, the charging station is electrically connected with a solar array on the light post that collects solar electric energy. Also mounted on the light post is a wind turbine that produces wind-generated electric energy. The electric energy from all three sources (i.e. solar, wind and grid) is consolidated in a storage battery at the charging station. The consolidated electric energy is then used for charging EVs, with an overriding priority given to electric energy allotted for regulated grid support requirements, such as street lighting and lighting for public venues.

20 Claims, 2 Drawing Sheets

(51) Int. Cl.
*H02J 7/35* (2006.01)
*F03D 9/11* (2016.01)
*F03D 9/25* (2016.01)
*F03D 9/00* (2016.01)
*F03D 13/20* (2016.01)
*F03D 1/04* (2006.01)
*F21S 8/08* (2006.01)
*B60L 53/31* (2019.01)
*H02S 20/10* (2014.01)
*F21S 9/03* (2006.01)
*F21S 9/04* (2006.01)
*H02S 10/12* (2014.01)
*F21Y 115/10* (2016.01)

(52) U.S. Cl.
CPC .............. *H02S 20/32* (2014.12); *H02S 40/38* (2014.12); *F21Y 2115/10* (2016.08); *Y02T 90/12* (2013.01)

(56) References Cited

U.S. PATENT DOCUMENTS

| | | | |
|---|---|---|---|
| 7,705,277 | B2 | 4/2010 | Noble |
| 8,648,551 | B2 | 2/2014 | Noble |
| 9,209,648 | B2 | 12/2015 | Wheatley |
| 2007/0246095 | A1 | 10/2007 | Schaefer |
| 2008/0037243 | A1* | 2/2008 | Discoe .................... F21S 9/026 362/183 |
| 2009/0050194 | A1 | 2/2009 | Noble |
| 2009/0229200 | A1 | 9/2009 | Noble |
| 2010/0235206 | A1 | 9/2010 | Miller |
| 2011/0049992 | A1 | 3/2011 | Sant'Anselmo |
| 2011/0055037 | A1 | 3/2011 | Hayashigawa |
| 2012/0182670 | A1 | 7/2012 | Prax |
| 2012/0260617 | A1 | 10/2012 | Gilpatrick |
| 2013/0037080 | A1 | 2/2013 | Helfan |
| 2013/0127395 | A1 | 5/2013 | Santos Silva Serra Duarte |
| 2017/0174090 | A1 | 6/2017 | Lakamp et al. |
| 2017/0324896 | A1* | 11/2017 | Gharabegian .......... A45B 25/02 |

* cited by examiner

LIGHT STANDARD WITH ELECTRIC VEHICLE (EV) CHARGER

FIELD OF THE INVENTION

The present invention pertains generally to stations for charging electric vehicles (EVs). More particularly, the present invention pertains to charging stations that use, in combination electric energy collected by solar energy sources, electric energy generated by wind turbines, and electric energy provided by a local distributed power grid. The present invention is particularly, but not exclusively useful as an EV charging station that uses consolidated electric energy from renewable sources (e.g. solar and wind) along with electric energy from a local distributed power grid for charging EVs; with an overriding priority given to electric energy uses for regulated grid support requirements, such as street lighting and lighting for public venues.

BACKGROUND OF THE INVENTION

Consumers who have large electric energy requirements, and who obtain their electric energy directly from a distributed power grid, are not always able to use the electric energy most efficiently. This is particularly so when such consumers are governmental agencies or large industrial entities that have variable electric energy requirements within any 24-hour period of time. For example, nighttime lighting for streets, parking lots, public parks, and other venues have large, daily recurring, electric energy requirements. Typically, these requirements are for determinable periods of time. Otherwise they are idle.

Insofar as actual light sources are concerned, within a particular power grid, different types of light sources will be employed for different operational purposes and have different electric energy (power) requirements. Despite these disparities, allotted power from the distributed power grid is available to all consumers. A consequence of this is that power allotted for a particular point in the grid may not be used, or used inefficiently.

In recent years, efforts have been made to supplement the distributed power grid with electric energy from renewable sources such as wind turbines and solar arrays. Although many of these renewable sources have been successfully implemented, distributed power grids are still used, and the above noted inefficiencies in power usage still persist. Thus, excess power from the distributed power grid is often available for use. The present invention, however, recognizes that this unused power may be most efficiently supplemented by employing renewable energy sources directly at the point of sale (i.e. at a light post location). A case on point is the growing need for convenient charging stations for electric vehicles.

With the above in mind, it is an object of the present invention to provide a charging station for electric vehicles (EVs) which will maximize the use of excess electric energy at a point in a distributed power grid by supplementing the excess energy with electric energy from renewable energy sources located at the point of sale. Another object of the present invention is to consolidate solar and wind generated electric energy with electric energy from a distributed power grid, and to prioritize a distribution of the consolidated energy for its optimal use. Still another object of the present invention is to incorporate renewable sources of electric energy (e.g. wind and solar) with a light post that is connected into a distributed power grid, to thereby establish an EV charging station that is easy to implement, is simple to use and is cost effective.

SUMMARY OF THE INVENTION

In accordance with the present invention, an electric vehicle (EV) charging station is co-located, and electrically connected, with a public/private light post in a populated area. In this combination, the EV charging station is connected with a distributed power grid and, via this connection, the EV charging station has access to any excess of power from the grid that has been allotted to the light post, but not used. In addition to its connection with the power grid, the EV charging station also incorporates renewable energy resources of electric energy which include a dedicated solar array for collecting solar electric energy and a dedicated wind turbine for obtaining wind-generated electric energy.

As envisioned for the present invention, the EV charging station is able to consolidate electric energy from three different energy sources. From its connection with the light post the EV charging station has access to any excess electric energy that has been allocated by the power grid for use by the light post, but which is not used. Supplementing the allocated-but-not-used grid electric energy is renewable energy from both the solar array (daytime operation), and the wind turbine (24 hours per day, every day). Operationally, the allocated grid electric energy, the collected solar electric energy, and the generated wind electric energy will be collectively consolidated in a storage battery which is provided as part of the EV charging station.

In the context of the present invention, with specific regard to the distributed power grid and the operational lighting function of the light post on the grid, several factors are to be appreciated. For one, the distributed power grid is operational 24 hours a day. For another, the lighting function of the light post is periodic and limited primarily to nighttime. Moreover, connections with the grid have been sized to supply (operate) inefficient high power lights at night. Consequently, when inefficient lighting is changed-out with more efficient lighting (e.g. a Light Emitting Diode (LED)), there is a potential for accessing the excess electric energy for other uses (e.g. an EV charging station).

With the above in mind, computer-control is provided for the operation of the present invention. In particular, this computer-control requires monitoring the level and capabilities of electric energy in the storage battery. On the one hand, for operational lighting requirements of the light post, there must always be sufficient excess electric energy from the power grid in the storage battery. On the other hand, when energy demands of the light post are minimal (e.g. during daylight hours) surplus electric energy in the storage battery is available for sale. With these competing considerations in mind, a balanced, efficient use of electric energy by the EV charging station is made possible by computer-control. Moreover, it is necessary for the computer to ensure that the collection of electric energy from the renewable sources is always the operational priority.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
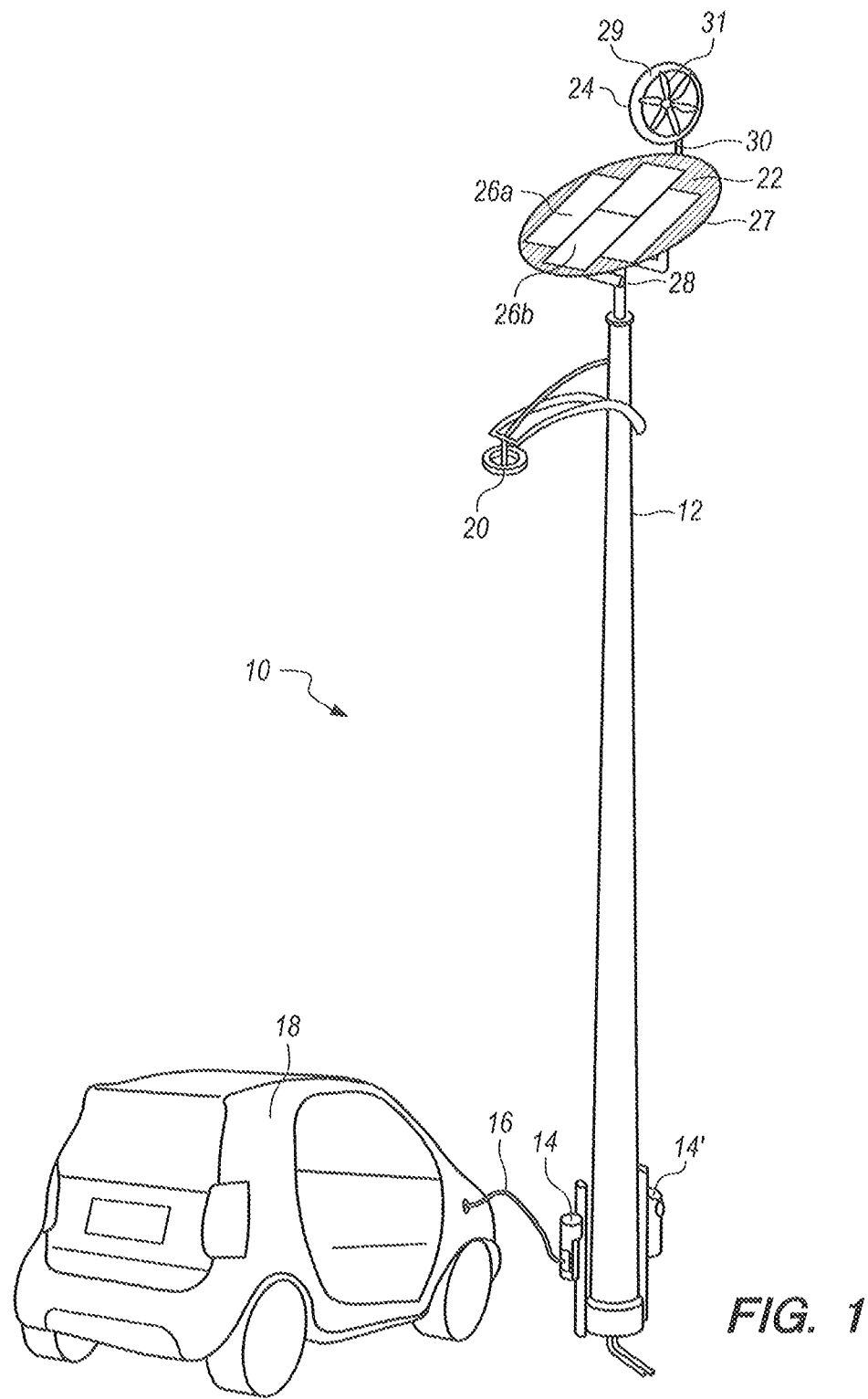
FIG. 1 is a perspective view of an electric vehicle being recharged at a charging station that is configured in accordance with the present invention.

Referring initially to FIG. 1, a charging station in accordance with the present invention is shown and is generally designated 10. As shown, the charging station includes a light post 12 which is commonly used to light large areas such as streets and parking lots. As envisioned for the present invention, the light post 12 may be of any type that is well known and commonly used. Importantly, the light post 12 will typically be connected with a distributed power grid (not shown), and it will preferably be located in a populated area. The light post 12 can be either publically or privately owned. In either case, due to its connection with the distributed power grid, the electric energy that can be used by the light post 12 will be regulated.

FIG. 1 also shows that the charging station 10 includes a connector(s) 14 (14') that is/are mounted on the light post 12. FIG. 1 also shows that the connector 14 is can be engaged, via a cable 16, with an electric vehicle 18 (hereinafter sometimes referred to simply as EV 18). Thus, although the charging station 10 is co-located with the light post 12, the primary purpose of the present invention is to electrically recharge an EV 18.

Still referring to FIG. 1 it will be seen that the charging station 10 of the present invention also includes a light source 20 which is mounted on the light post 12. Preferably, the light source 20 is an efficient, high output, low power street light, such as a Light Emitting Diode (LED). Also included with the charging station 10 is a solar array 22, and a wind turbine 24, both of which are mounted on the light post 12, above the light source (LED) 20.

With specific regard to the solar array 22, it will be seen that the solar array 22 has a plurality of panels 26, of which the panels 26a and 26b are only exemplary. Each of the panels 26 are mounted on a frame 27, and each panel 26 will support a plurality of photovoltaic cells of a type well known in the pertinent art for the purpose of collecting solar electric energy. Further, the solar array 22 may optionally include a drive motor 28 that is engaged with the panels 26 to provide a sun-tracking capability for the solar array 22. In its combination, the solar array 22 is intended to provide "Sun Tracking Solar Panels" as disclosed and claimed in U.S. Pat. No. 7,705,277 which is assigned to the same assignee as the present invention.

Insofar as the wind turbine 24 is concerned, the wind turbine 24 includes a shroud 29 which surrounds a plurality of turbine blades 31. As shown, the wind turbine 24 is mounted on an elongated support structure 30 at the top of light post 12 which defines a vertical axis. For purposes of the present invention, when it is mounted on the support structure 30, the wind turbine 24 is capable of a 360° rotation around the vertical axis of the support structure 30. Depending on wind conditions, the wind turbine 24 is capable of continuously generating wind electric energy on a 24-hour basis, 7 days a week.

Figure 2:
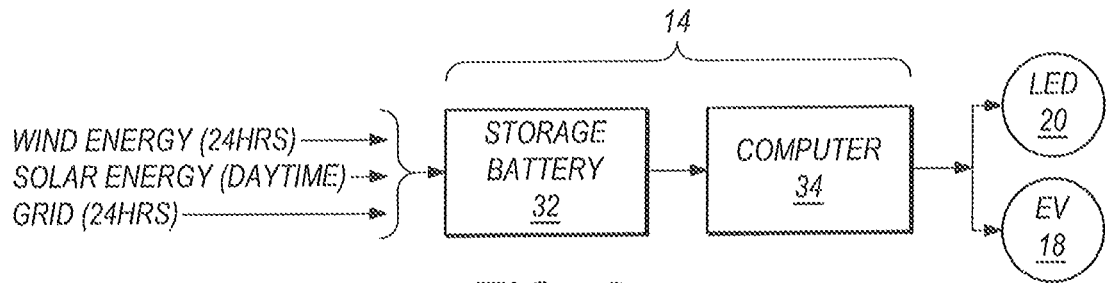
FIG. 2 is a functional layout of the essential interoperative elements for a computer controlled operation of the present invention.

With reference now to FIG. 2, it is to be appreciated that the connector 14 includes a storage battery 32 and a computer 34. For the charging station 10, the storage battery 32 is electrically connected with the solar array 22, the wind turbine 24 and the distributed grid. In combination with each of these individual components, the storage battery 32 is provided to consolidate: i) wind electric energy from the wind turbine 24; ii) solar electric energy from the solar array 22; and iii) grid electric energy from the distributed power grid. As envisioned for the present invention, a collection of the electric energy that is stored in the storage battery 32 is prioritized by first charging the storage battery 32 with electric energy from renewable resources: namely, the solar array 22 and the wind turbine 24. Specifically, this is done before electric energy is taken from the distributed power grid.

An important aspect of the present invention is that the charging station 10 must always be capable of meeting the operational lighting requirements of the light post 12. For this purpose, there must always be sufficient excess electric energy from the power grid in the storage battery 32. In accordance with the present invention, this excess power (electric energy) is determined as being the difference between the electric energy that is allotted from the distributed power grid for energizing the light source 12, and the electric energy demand requirement of the light source (LED) 20. Moreover, when energy demands of the light post 12 are minimal (e.g. during daylight hours) the surplus of excess electric energy in the storage battery 32 can be made available for sale and used to charge EV 18. In order to coordinate these capabilities, an operation of the charging station 10 is placed under the control of a computer 34.

Figure 3:
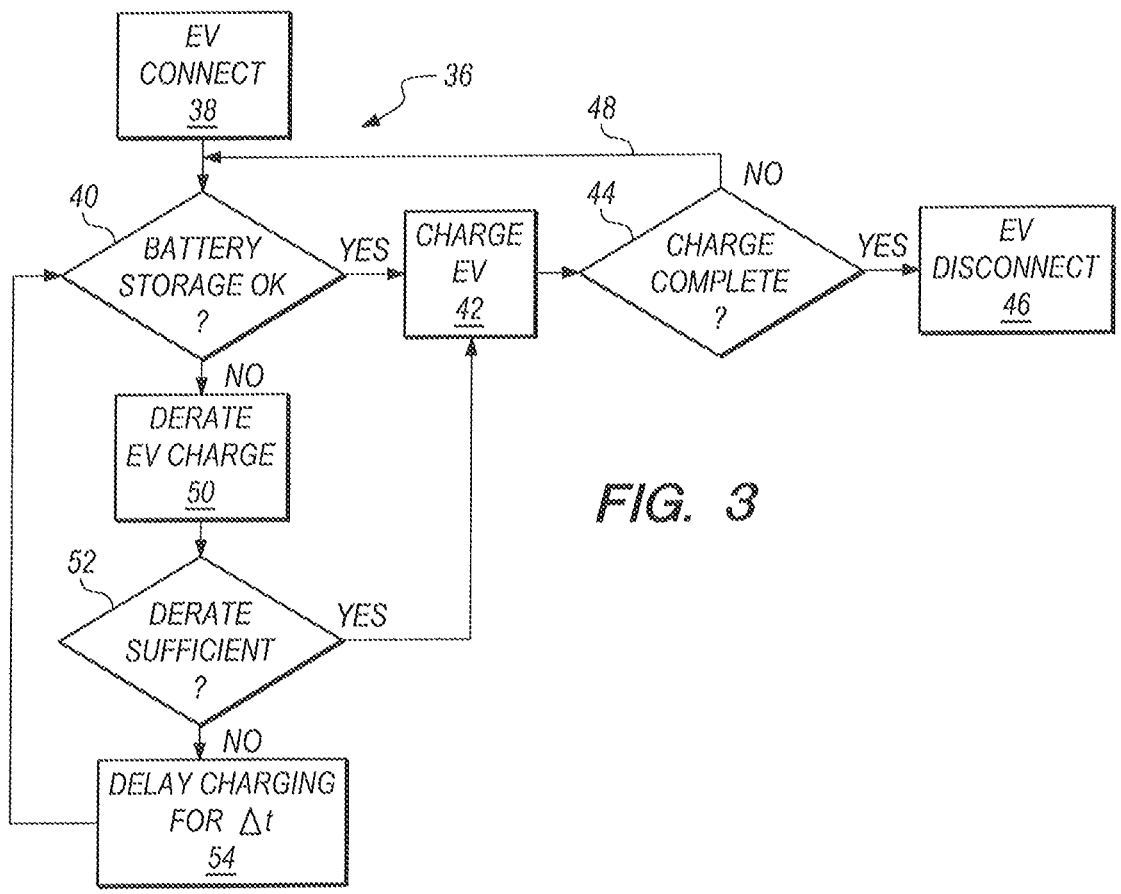
FIG. 3 is a logic flow chart of the operational tasks performed under computer-control during an operation of the present invention.

Computer-control for charging station 10 is illustrated by the logic flow chart 36 shown in FIG. 3. As shown, task block 38 in flow chart 36 indicates that an operation of the charging station 10 begins when an EV 18 is connected via cable 16 with a connector 14 of charging station 10. Inquiry block 40 then determines whether the storage battery 32 has sufficient electric energy for recharging the EV 18. As noted above, it is important that storage battery 32 must necessarily maintain sufficient energy for operating the light source (LED) 20. If sufficient electric energy is available in storage battery 32, a normal charging operation can be initiated.

For a normal operation of the charging station 10, after the EV 18 is connected to the charging station 10 (block 38), and when it has been determined there is sufficient electric energy in the storage battery 32, the EV 18 can be charged (task block 42). Inquiry block 44 then determines when the charging of EV 18 has been completed. When charging has been completed, task block 46 then provides for a disconnect of the EV 18 from the charging station 10. This, of course, occurs as long as the storage battery 32 is able to perform its primary operational function of operating the light source (LED) 20. Accordingly, the connection 48 shown between inquiry block 44 and inquiry block 40 indicates that the level of electric energy in the storage battery 32 is continually monitored during the charging of the EV 18.

Insofar as storage battery 32 is concerned, it is to be appreciated that it receives electric energy from three different sources. One source of electric energy is the distributed power grid (i.e. grid electric energy) which is continuously available, assuming excess electric energy is available and that the grid is operational. As noted above, grid electric energy is regulated and therefore allotted. Consequently, access to grid electric energy can be problematic. Its accessibility, however, can be improved by using more efficient lighting, such as light source (LED) 20.

Another source of energy is solar electric energy that is provided by the solar array 22. Weather permitting, solar electric energy is available every day during daylight hours. Finally, depending on wind conditions, wind electric energy that is generated by the wind turbine 24 is continuously operational on a 24 hour basis. Importantly, it is the collective contribution of electric energy from these three different energy sources that is monitored by the computer 34 at inquiry block 40.

As intended for the present invention, when inquiry block 40 indicates there is not sufficient electric energy in storage battery 32, task block 50 then proceeds to derate the charging of EV 18 (i.e. the rate at which EV 18 can be charged is lowered). Inquiry block 52 then determines whether the derating is sufficient. If the derating is sufficient, chart 36 shows that the charging of EV 18 can continue, and that the level of energy in the storage battery 32 will continue to be monitored. On the other hand, if derating is not sufficient, task block 54 initiates a charging delay for a time duration Δt. The length of time duration Δt can vary, and it will be dependent on the collective abilities of solar array 22, wind turbine 24 and the distributed grid to provide electric energy for the charging station 10.

While the particular Light Standard with Electric Vehicle (EV) Charger as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A charging station, in combination with a light post, for a prioritized charging of an electric vehicle (EV) with electric energy from renewable energy sources and from a distributed power grid, wherein the charging station and light post combination comprises:
    a storage battery mounted on the light post;
    a light source mounted on the light post, wherein the light source is connected with the distributed power grid for illuminating an area, and wherein the storage battery is connected with the distributed power grid to receive excess power therefrom as a lower priority when the excess power is not consumed by the light source;
    a solar array mounted on the light post, wherein the solar array includes a plurality of photovoltaic cells for generating solar electric energy, and wherein the solar array is connected with the storage battery for transfer of the generated solar electric energy to the storage battery;
    a support structure mounted on the light post, wherein the support structure defines a vertically oriented axis;
    a wind turbine mounted on the support structure and positioned above the solar array for generating wind electric energy, wherein the wind turbine is rotatable through a 360° horizontal arc, and wherein the wind turbine is connected with the storage battery for transfer of the wind generated electric energy to the storage battery; and
    a connector mounted on the light post for interconnecting the storage battery with the electric vehicle (EV) for charging the EV.

2. The charging station recited in claim 1 wherein the light source is a Light Emitting Diode (LED).

3. The charging station recited in claim 1 wherein excess power is determined as a difference between the electric energy allotted from the distributed power grid for energizing the light source and the electric energy demand requirement of the light source.

4. The charging station recited in claim 1 wherein electric energy stored in the storage battery is prioritized by first charging the storage battery with available electric energy from the renewable resources of the solar array and the wind turbine, before electric energy is taken from the distributed power grid.

5. The charging station recited in claim 1 wherein a plurality of charging stations is connected with the light post.

6. The charging station recited in claim 1 wherein the solar array comprises:
    at least one panel of photovoltaic cells;
    a frame for supporting the panel of photovoltaic cells in a planar array; and
    a drive motor mounted on the light post and connected to the frame for rotating the panel of photovoltaic cells in a direction, on a predetermined path, for a predetermined time duration, for daytime sun tracking.

7. The charging station recited in claim 1 wherein the wind turbine comprises:
    a shroud formed as an annulus and defining a shroud diameter, wherein the shroud is mounted on the support structure with the defined shroud diameter coaxial with the vertical axis of the support structure, for rotation of the shroud about the vertical axis through a complete 360° arc; and
    a plurality of turbine blades mounted as a wheel on a rotator and positioned within the shroud for rotation about a turbine axis to generate wind electric energy in response to wind blowing through the shroud, wherein the turbine axis is perpendicular to the vertical axis of the support structure.

8. An electric vehicle (EV) charging station mounted on a light post which comprises:
    a collector, wherein the collector includes a solar array mounted on the light post for collecting solar electric energy, a wind turbine mounted on the light post above the solar panel and rotatable through a 360° arc for generating wind electric energy, and a grid connector for establishing an electrical connection with a distributed power grid, wherein the distributed power grid provides a predetermined allotment of grid electric energy for the light post;
    a storage battery connected with the collector for consolidating and prioritizing the solar electric energy, the wind electric energy and the grid electric energy, with grid electric energy as a lower priority;
    a light source mounted on the light post for illuminating an area, wherein the light source receives operational electric energy from the storage battery; and
    an EV connector for interconnecting the storage battery with the electric vehicle for charging the EV.

9. The charging station of claim 8 wherein the solar array comprises:
    at least one panel of photovoltaic cells;
    a frame for supporting the panel of photovoltaic cells in a planar array; and
    a drive motor mounted on the light post and connected to the frame for rotating the panel of photovoltaic cells in a direction, on a predetermined path, for a predetermined time duration, for daytime sun tracking.

10. The charging station of claim 8 wherein the wind turbine comprises:
a support structure mounted on the light post and connected with the wind turbine to position the wind turbine on the light post, wherein the support structure defines a vertically oriented axis;
a shroud formed as an annulus and defining a shroud diameter, wherein the shroud is mounted on the support structure with the defined shroud diameter coaxial with the vertical axis of the support structure, for rotation of the shroud about the vertical axis through a complete 360° arc; and
a plurality of turbine blades mounted as a wheel on a rotator and positioned within the shroud for rotation about a turbine axis to generate wind electric energy in response to wind blowing through the shroud, wherein the turbine axis is perpendicular to the vertical axis of the support structure.

11. The charging station of claim 8 wherein the storage battery is connected with the distributed power grid to receive excess electric energy therefrom when the excess electric energy is not consumed by the light source, and wherein the excess electric energy is determined as a difference between the electric energy allotted from the distributed power grid for energizing the light source and the electric energy demand requirement of the light source.

12. The charging station of claim 11 wherein electric energy stored in the storage battery is prioritized by first charging the storage battery with available electric energy from the renewable resources of the solar array and the wind turbine, before electric energy is taken from the distributed power grid.

13. The charging station of claim 8 wherein the light source is a Light Emitting Diode (LED).

14. The charging station recited in claim 8 wherein a plurality of charging stations is connected with the light post.

15. A non-transitory, computer-readable medium having executable instructions stored thereon that direct a computer system to perform a process for operating an electric vehicle (EV) charging station, the medium comprising instructions for:
monitoring a light source mounted on a light post, to ensure sufficient electric energy is taken from a distributed power grid and held in a storage battery for an operational use by the light source to illuminate an area;
consolidating electric energy contributions to the storage battery from a solar array mounted on the light post (solar electric energy), a wind turbine mounted on the light post above the solar array and rotatable through a 360° arc (wind electric energy), and a predetermined allotment of electric energy from the distributed power grid (grid electric energy), to establish a combined electric energy capacity for the storage battery;
prioritizing the collection of electric energy in the storage battery by first charging the storage battery with available electric energy from the renewable resources of the solar array and the wind turbine, before electric energy is taken from the distributed power grid; and
dispensing electric energy from the storage battery, on demand, to charge an electric vehicle when there is excess electric energy in the storage battery, and to otherwise suspend dispensing of the electric energy.

16. The medium of claim 15 further comprising an instruction for selling electric energy from the storage battery under preset conditions.

17. The medium of claim 15 further comprising an instruction for derating a charging rate capability of the charging station to maintain excess electric energy in the storage battery when the excess electric energy in the storage battery is below a predetermined level.

18. The medium of claim 15 wherein the excess electric energy is determined as a difference between the electric energy allotted from the distributed power grid for energizing the light source and the electric energy demand requirement of the light source.

19. The medium of claim 15 wherein the solar array is mounted on the light post and comprises:
at least one panel of photovoltaic cells;
a frame for supporting the panel of photovoltaic cells in a planar array; and
a drive motor mounted on the light post and connected to the frame for rotating the panel of photovoltaic cells in a direction, on a predetermined path, for a predetermined time duration, for daytime sun tracking.

20. The medium of claim 15 wherein the wind turbine comprises:
a support structure mounted on the light post, wherein the support structure defines a vertically oriented axis;
a shroud formed as an annulus and defining a shroud diameter, wherein the shroud is mounted on the support structure with the defined shroud diameter coaxial with the vertical axis of the support structure, for rotation of the shroud about the vertical axis through a complete 360° arc; and
a plurality of turbine blades mounted as a wheel on a rotator and positioned within the shroud for rotation about a turbine axis to generate wind electric energy in response to wind blowing through the shroud, wherein the turbine axis is perpendicular to the vertical axis of the support structure.

\* \* \* \* \*